(12) United States Patent
Kakiuchi et al.

(10) Patent No.: US 9,343,948 B2
(45) Date of Patent: May 17, 2016

(54) LINEAR ACTUATOR

(75) Inventors: Takashi Kakiuchi, Sagamihara (JP); Kousuke Satou, Sagamihara (JP)

(73) Assignee: KYB Corporation, Tokyo (JP)

( * ) Notice: Subject to any disclaimer, the term of this patent is extended or adjusted under 35 U.S.C. 154(b) by 537 days.

(21) Appl. No.: 13/820,609

(22) PCT Filed: Aug. 31, 2011

(86) PCT No.: PCT/JP2011/069730
§ 371 (c)(1),
(2), (4) Date: Mar. 4, 2013

(87) PCT Pub. No.: WO2012/035979
PCT Pub. Date: Mar. 22, 2012

(65) Prior Publication Data
US 2013/0175886 A1    Jul. 11, 2013

(30) Foreign Application Priority Data

Sep. 16, 2010    (JP) .................................. 2010-207577

(51) Int. Cl.
*H02K 41/03*    (2006.01)
*F16F 6/00*    (2006.01)
*H02K 1/18*    (2006.01)
*H02K 5/10*    (2006.01)
(Continued)

(52) U.S. Cl.
CPC ................ *H02K 41/031* (2013.01); *F16F 6/00* (2013.01); *H02K 1/18* (2013.01); *H02K 1/28* (2013.01); *H02K 5/10* (2013.01); *H02K 5/1672* (2013.01); *H02K 7/08* (2013.01)

(58) Field of Classification Search
CPC ...... H02K 33/12; H02K 33/14; H02K 41/031
USPC ....................................................... 310/12.31
See application file for complete search history.

(56) References Cited

U.S. PATENT DOCUMENTS 5,434,549 A * 7/1995 Hirabayashi et al. ......... 335/229
6,619,147 B1 * 9/2003 Kojima ........................ 74/89.36
(Continued)

FOREIGN PATENT DOCUMENTS

JP    2001124170 A    5/2001
JP    2003-211088 A    7/2003
(Continued)

OTHER PUBLICATIONS

Office Action mailed Mar. 18, 2014, corresponds to Japanese patent application No. 2010-207577.
(Continued)

*Primary Examiner* — Quyen Leung
*Assistant Examiner* — Eric Johnson
(74) *Attorney, Agent, or Firm* — Hauptman Ham, LLP

(57) ABSTRACT

A linear actuator for generating a thrust force for relatively displacing an outer tube and an inner tube in an axial direction includes a rod standing in an axial center part of the inner tube, a plurality of permanent magnets held side by side in an axial direction by the rod, a plurality of coils facing the permanent magnets, and a holder that is fixed to the outer tube and holds the plurality of coils. The holder includes a tubular coil holding portion that is provided in an annular space formed between the rod and the inner tube and holds the coils. A clearance is formed between the outer periphery of the coil holding portion and the inner periphery of the inner tube.

3 Claims, 3 Drawing Sheets

(51) Int. Cl.
*H02K 7/08* (2006.01)
*H02K 1/28* (2006.01)
*H02K 5/167* (2006.01)

(56) References Cited

U.S. PATENT DOCUMENTS

2003/0034697 A1* 2/2003 Goldner et al. ............... 310/17
2003/0164647 A1* 9/2003 Kobayashi et al. ............ 310/12

FOREIGN PATENT DOCUMENTS

| JP | 2005-106242 A | 4/2005 |
| JP | 2010-104089 A | 5/2010 |
| JP | 2010-104091 A | 5/2010 |

OTHER PUBLICATIONS

International Search Report and Written Opinion corresponding to PCT/JP2012/069730, dated Nov. 22, 2011.

* cited by examiner

LINEAR ACTUATOR

TECHNICAL FIELD

This invention relates to a linear actuator.

BACKGROUND ART

A damping linear actuator for damping the roll of a vehicle is disclosed in JP2005-106242A.

The linear actuator disclosed in JP2005-106242A includes an outer tube, an inner tube slidably inserted into the outer tube and a rod standing from a bottom portion of the outer tube and sliding contact with the inner periphery of the inner tube. The inner tube is supported by a bearing mounted on the inner periphery of an opening of the outer tube and a bearing mounted on the outer periphery of the rod.

The linear actuator includes a plurality of annular permanent magnets held side by side in an axial direction on the outer periphery of the inner tube and a plurality of coils held on the inner periphery of the outer tube and facing the permanent magnets. The direction and magnitude of a current flowing in each coil are controlled to generate a thrust force for relatively displacing the outer tube and the inner tube in the axial direction, thereby damping the roll of a vehicle.

SUMMARY OF THE INVENTION

In the linear actuator disclosed in JP2005-106242A, the inner tube is supported by the bearings mounted on the inner periphery of the outer tube and the outer periphery of the rod. Thus, the inner tube may be strained form the bearings as a base point by being subjected to a load acting in a radial direction. In such a case, this strain may be transferred to the permanent magnets held on the outer periphery of the inner tube to break the permanent magnets.

This invention has been designed in consideration of these problems, and an object thereof is to provide to provide a linear actuator capable of a stable operation even upon being subjected to a load acting in a radial direction.

The present invention provides a linear actuator for generating a thrust force for relatively displacing an outer tube and an inner tube slidably inserted into the outer tube in an axial direction. The linear actuator includes a rod standing in an axial center part of the inner tube, a plurality of permanent magnets held side by side in an axial direction by the rod, a plurality of coils facing the permanent magnets; and a holder that is fixed to the outer tube and holds the plurality of coils, wherein the holder includes a tubular coil holding portion that is provided in an annular space formed between the rod and the inner tube and holds the coils, and a clearance is formed between the outer periphery of the coil holding portion and the inner periphery of the inner tube.

EMBODIMENTS OF THE INVENTION

Figure 1:
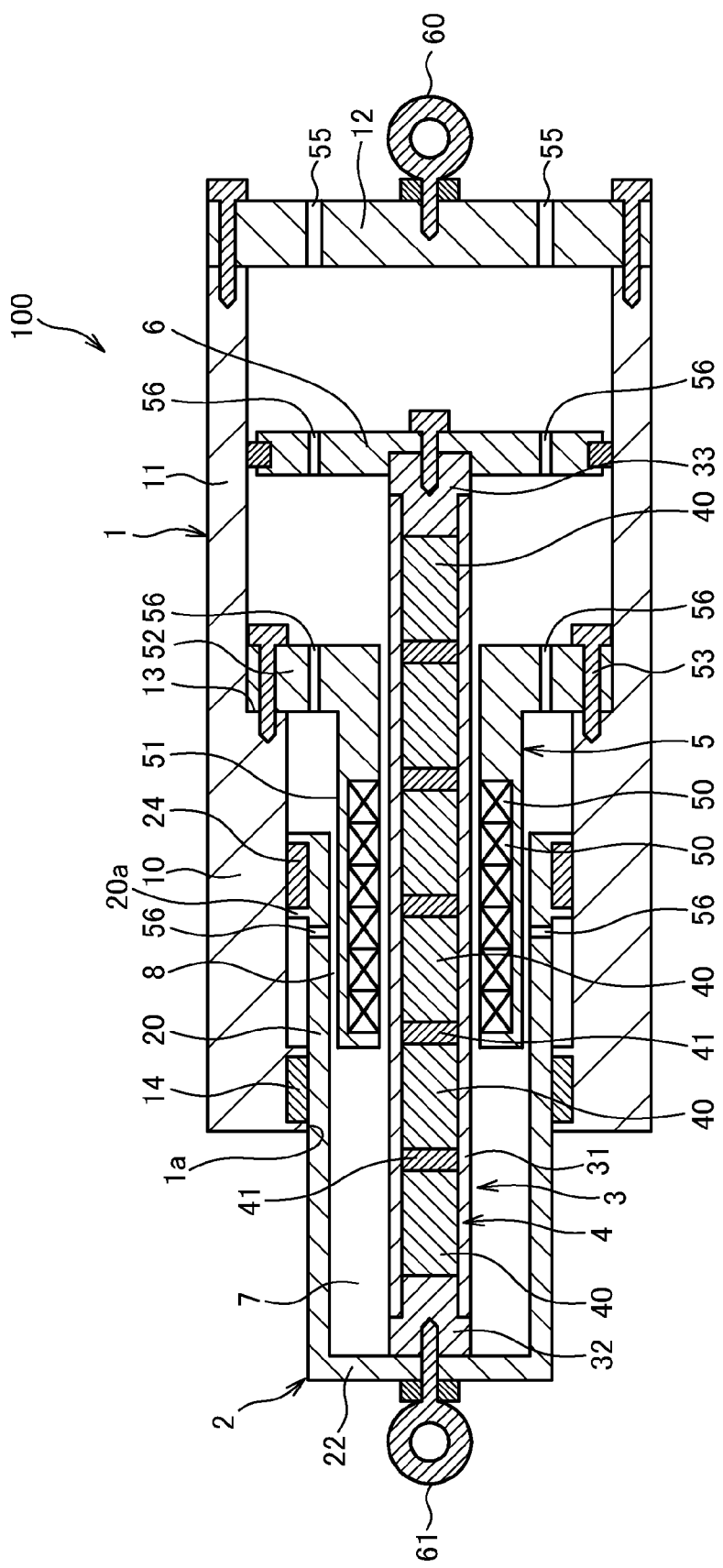
FIG. 1 is a longitudinal sectional view showing a linear actuator according to an embodiment of the present invention.

Hereinafter, an embodiment of the present invention is described with reference to the drawings.

A linear actuator 100 according to the embodiment of the present invention is described with reference to FIG. 1.

The linear actuator 100 is a damping linear actuator to be provided in automotive vehicles, railroad vehicles, buildings and the like.

The linear actuator 100 includes an outer tube 1, an inner tube 2 slidably inserted into the outer tube 1, and a rod 3 standing in an axial center part of the inner tube 2. The outer tube 1 and the inner tube 2 are bottomed tubular members.

The linear actuator 100 includes a field magnet 4 composed of a plurality of permanent magnets 40 held side by side in an axial direction in the rod 3, a plurality of coils 50 facing the field magnet 4, and a holder 5 fixed to the outer tube 1 and configured to hold the coils 50, and generates a thrust force for relatively displacing the outer tube 1 and the inner tube 2 in the axial direction.

The holder 5 includes a tubular coil holding portion 51 for holding the coils. The coil holding portion 51 is provided in an annular space 7 formed between the outer periphery of the rod 3 and the inner periphery of the inner tube 2. Further, a clearance 8 is formed between the outer periphery of the coil holding portion 51 and the inner periphery of the inner tube 2.

Each component part of the linear actuator 100 is described in detail below.

The linear actuator 100 is coupled to two relatively movable members, e.g. a vehicle body and a movable body, via devises 60, 61 respectively provided on the outer surfaces of bottom portions of the outer tube 1 and the inner tube 2.

In this embodiment, the outer tube 1 and the holder 5 for holding the coils 50 fixed to the outer tube 1 are a stationary element. Further, the inner tube 2, the rod 3 standing in the axial center part of the inner tube 2 and a rod guide 6 provided on a tip end part of the rod 3 are a movable element.

The linear actuator 100 damps vibration input to the vehicle body by relatively moving the stationary element and the movable element.

The outer tube 1 includes a small-diameter tubular portion 10 which has an opening 1a into which the inner tube 2 is to be inserted and with the inner periphery of which the inner tube 2 slides contact, a large-diameter tubular portion 11 which extends coaxially with the small-diameter tubular portion 10, and a bottom portion 12 which closes an end opening of the large-diameter tubular portion 11 and on the outer surface of which the clevis 60 is provided. The bottom portion 12 is bolted to an end part of the large-diameter tubular portion 11.

The small-diameter tubular portion 10 and the large-diameter tubular portion 11 have an equal outer diameter, and the inner diameter of the small-diameter tubular portion 10 is smaller than that of the large-diameter tubular portion 11. An annular step portion 13 is formed on a boundary between the inner peripheries of the small-diameter tubular portion 10 and the large-diameter tubular portion 11.

An annular first bearing 14 sliding contact with the outer periphery of the inner tube 2 is provided on the inner periphery of the opening 1a of the outer tube 1.

The inner tube 2 includes a tubular movable portion 20, the outer periphery of which slides contact with the first bearing 14 provided on the outer tube 1, and a bottom portion 22 which closes an end opening of the tubular movable portion 20 and on the outer surface of which the clevis 61 is provided.

A jaw portion 20a having a large outer diameter is formed on the outer periphery of a tip end side of the tubular movable portion 20. An annular second bearing 24 sliding contact with the inner periphery of the outer tube 1 is provided on the jaw portion 20a.

Since the inner tube 2 is supported via the first bearing 14 and the second bearing 24, it can slide relative to the outer tube 1 while sufficient rigidity is ensured against a load acting in a radial direction.

The rod 3 includes a tubular portion 31 and cap members 32, 33 for closing openings on both ends of the tubular portion 31. One cap member 32 is linked to the center of the bottom portion 22 of the inner tube 2. The other cap member 33 is linked to the center of the rod guide 6 sliding contact with the inner periphery of the outer tube 1. In this way, a base end part of the rod 3 is fixed to the bottom portion 22 of the inner tube 2 and the rod guide 6 is provided on a tip end part thereof. The rod 3 is provided to movably penetrate through a hollow part in the axial center of the substantially tubular holder 5.

The field magnet 4 composed of the plurality of permanent magnets 40 arranged side by side in the axial direction is accommodated in a hollow part inside the rod 3. In this way, the permanent magnets 40 are held side by side in the axial direction in the rod 3. By this, even if a load acts on the inner tube 2 in a radial direction to strain the inner tube 2, that strain is not transferred to the rod 3, whereby breakage of the permanent magnets 40 due to the transfer of the strain of the inner tube 2 to the permanent magnets 40 can be prevented.

The permanent magnets 40 are formed into rods and so magnetized that an N pole and an S pole appear in the axial direction. The adjacent permanent magnets 40 are accommodated side by side in the axial direction in the rod 3 with the same poles facing each other. Yokes 41 are provided between the adjacent permanent magnets 40.

Instead of being formed into rods, the permanent magnets 40 may be formed into rings and held on the outer periphery of the rod 3. In such a case, the permanent magnets 40 may be so configured that the inner and outer peripheries are polarized and may be so arranged that N poles and S poles alternately appear along the axial direction of the rod 3. Further, it is not always necessary to provide the yokes 41.

By providing the rod guide 6 on the tip end part of the rod 3, the tip end side of the rod 3 can be prevented from shaking in radial directions when the rod 3 moves in the axial direction in the outer tube 1 according to a displacement of the inner tube 2 relative to the outer tube 1. That is, the roll of the rod 3 can be prevented.

In this way, the rod guide 6 prevents the rod 3 from rolling to interfere with the holder 5 when the linear actuator expands and contracts. Thus, a distance between the permanent magnets 40 accommodated in the rod 3 and the coils 50 held in the holder 5 can be kept constant. Accordingly, axial misalignment between the permanent magnets 40 and the coils 50 is prevented and the linear actuator 100 can stably generate a thrust force. If the permanent magnets 40 are configured to be held on the outer periphery of the rod 3, the rod guide 6 prevents the permanent magnets 40 from interfering with the holder 5.

The holder 5 includes the tubular coil holding portion 51 for holding the plurality of coils 50 facing the permanent magnets 40 on the inner periphery, and a flange portion 52 fixed to the step portion 13 of the outer tube 1 via a bolt 53. The flange portion 52 has a function of restricting any further movement by the contact with an end part of the inner tube 2.

The coil holding portion 51 moves back and forth in the annular space 7 formed between the rod 3 and the inner tube 2 according to a relative displacement of the outer tube 1 and the inner tube 2. Further, the predetermined clearance 8 is present between the outer periphery of the coil holding portion 51 and the inner periphery of the inner tube 2. This can prevent the transfer of a strain to the coil holding portion 51 even if a load acts on the inner tube 2 in a radial direction to strain the inner tube 2.

Accordingly, even if a load acts on the inner tube 2 in a radial direction to strain the inner tube 2, the strain of the inner tube 2 is transferred neither to the rod 3 holding the permanent magnets 40 nor to the coil holding portion 51 holding the coils 50. Thus, the distance between the permanent magnets 40 and the coils 50 is kept constant and the linear actuator 100 can stably generate a thrust force.

The clearance 8 may be appropriately set within a range capable of preventing the transfer of the strain of the inner tube 2 to the coil holding portion 51.

The coils 50 are arranged to be located within an axial length range of the field magnet 4 and constantly face the field magnet 4 within a stroke range of the rod 3. This prevents a situation where a thrust force generated by the linear actuator 100 becomes insufficient.

The linear actuator 100 is equipped with a controller as a control means. The controller controls the magnitude and direction of a current applied to the coils 50 based on relative position information of the coils 50 and the permanent magnets 40 detected by a position sensor (not shown). In this way, a thrust force generated by the linear actuator 100 and a generation direction of the thrust force are controlled. It should be noted that the thrust force generated by the linear actuator 100 and the generation direction of the thrust force may be controlled by a controller equipped in the vehicle instead of equipping the linear actuator 100 with the controller.

Six coils 50 are shown in FIG. 1. However, the number of the coils 50 may be set at a number suitable for a thrust force generated by the linear actuator 100 and an energizing method.

A suction/discharge hole 55 is formed in the bottom portion 12 of the outer tube 1. Further, the tubular movable portion 20 of the inner tube 2, the flange portion 52 of the holder 5 and the rod guide 6 are formed with communication holes 56. When the linear actuator 100 expands and contracts, air is sucked into and discharged from the linear actuator 100 through the suction/discharge hole 55 and air in the linear actuator 100 moves through the communication holes 56. In this way, the linear actuator 100 smoothly expands and contracts.

The positions and numbers of the suction/discharge hole 55 and the communication holes 56 are appropriately selected insofar as the expansion and contraction of the linear actuator are enabled and a volumetric change in the linear actuator 100 associated with the expansion and contraction can be compensated.

Next, modifications of the embodiment of the present invention are described with reference to FIGS. 2 and 3. The following description is centered on points of difference from the above embodiment and the same components as the linear actuator 100 according to the above embodiment are denoted by the same reference signs and not described.

Figure 2:
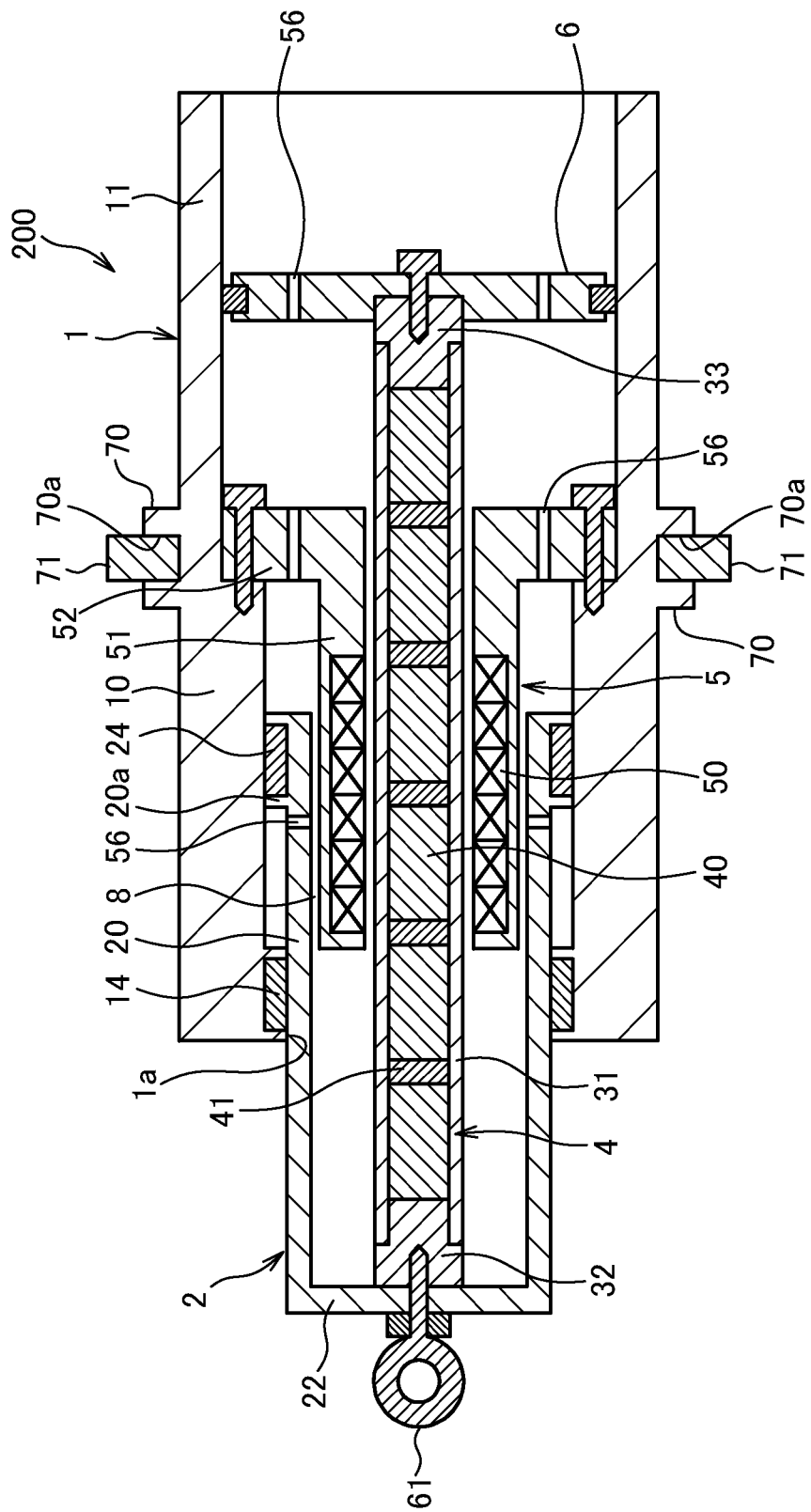
FIG. 2 is a longitudinal sectional view showing a modification of the linear actuator according to the embodiment of the present invention.

First, a linear actuator 200 shown in FIG. 2 is described. In the linear actuator 100 according to the above embodiment, the devises 60, 61 provided on the both ends of the linear actuator 100 are respectively coupled to the vehicle body and the movable body. The linear actuator 200 differs from the linear actuator 100 in a method for coupling the outer tube 1 to the vehicle body.

A pair of brackets 70 including shaft insertion holes 70a at positions opposite to each other are provided on the outer periphery of the outer tube 1. Supporting shafts 71 projecting in radial directions of the outer tube 1 are inserted into the shaft insertion holes 70a of the pair of brackets 70.

The outer tube 1 is swingably coupled to the vehicle body via a pair of supporting shafts 71. In this way, the outer tube 1 is coupled to the vehicle body by a trunnion structure. The inner tube 2 is coupled to the movable body via the clevis 61 similarly to the linear actuator 100.

In the linear actuator 200, a mounting length of the linear actuator 200 can be made shorter than that of the linear actuator 100, the both ends of which are coupled via the devises 60, 61.

Figure 3:
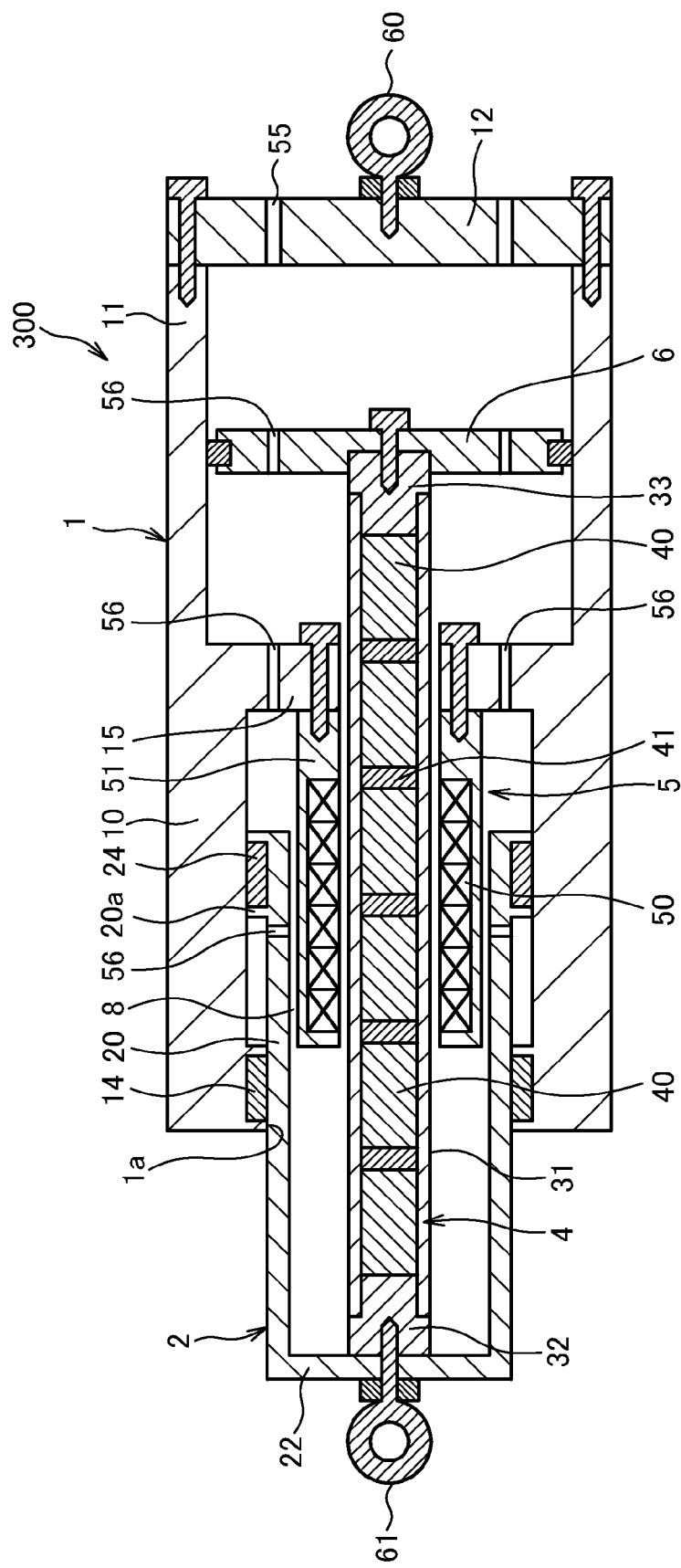
FIG. 3 is a longitudinal sectional view showing a modification of the linear actuator according to the embodiment of the present invention.

Next, a linear actuator 300 shown in FIG. 3 is described.

In the linear actuator 100 according to the above embodiment, the flange portion 52 of the holder 5 is bolted to the step portion 13 of the outer tube 1. A method for fixing the holder 5 to the outer tube 1 is appropriately changed and the linear actuator 300 includes an example of that.

In the linear actuator 300, the holder 5 is a tubular member composed only of the coil holding portion 51 for holding the coils 50 without including the flange portion 52. Further, the step portion 13 protrudes inwardly from the inner periphery of the outer tube 1 to form an annular stopper portion 15. The stopper portion 15 has a function of restricting any further movement by the contact with an end part of the inner tube 2. An end part of the holder 5 is bolted to the stopper portion 15.

According to the embodiment described above, the following functions and effects are achieved.

Since the rod 3 holding the permanent magnets 40 stands in the axial center part of the inner tube 2, even if a load acts on the inner tube 2 in a radial direction to strain the inner tube 2, that strain does not act on the rod 3. Thus, breakage of the permanent magnets 40 can be prevented.

Further, since the clearance 8 is present between the coil holding portion 51 of the holder 5 and the inner tube 2, even if a load acts on the inner tube 2 in a radial direction to strain the inner tube 2, that strain does not act on the coil holding portion 51. Thus, a change in the distance between the permanent magnets 40 and the coils 50 and the interference of the permanent magnets 40 and the coils 50 can be prevented.

It is apparent that the present invention is not limited to the above embodiment and various changes can be made within the scope of the technical concept of the present invention.

With respect to the above description, the contents of application No. 2010-207577, with a filing date of Sep. 16, 2010 in Japan, are incorporated herein by reference.

The invention claimed is:

1. A linear actuator for generating a thrust force for relatively displacing an outer tube and an inner tube, said linear actuator comprising:
    the outer tube;
    the inner tube slidably inserted into the outer tube in an axial direction of the linear actuator;
    a rod standing in an axial center part of the inner tube;
    a plurality of permanent magnets held side by side in the axial direction by the rod;
    a plurality of coils facing the permanent magnets; and
    a holder that is fixed to the outer tube and holds the plurality of coils,
    wherein
    the holder includes a tubular coil holding portion provided in an annular space formed between the rod and the inner tube, the tubular coil holding portion holding the plurality of coils,
    a clearance is formed between an outer periphery of the tubular coil holding portion and an inner periphery of the inner tube,
    the rod penetrates through the holder,
    a base end part of the rod is fixed to a bottom portion of the inner tube, and
    a rod guide in sliding contact with an inner periphery of the outer tube is provided on a tip end part of the rod,
    the linear actuator further comprising:
        a first bearing provided on the inner periphery of the outer tube, at an opening of the outer tube into which the inner tube is inserted, the first bearing in sliding contact with an outer periphery of the inner tube; and
        a second bearing provided on the outer periphery of the inner tube, at a tip end side of the inner tube, and in sliding contact with the inner periphery of the outer tube.

2. The linear actuator according to claim 1, wherein the plurality of permanent magnets are accommodated side by side in the axial direction in a hollow part inside the rod.

3. The linear actuator according to claim 1, wherein the inner tube is configured to be coupled to one of two relatively movable members via a clevis provided on the bottom portion of the inner tube; and
the outer tube is configured to be swingably coupled to the other of the two relatively movable members via a pair of supporting shafts provided at positions opposite to each other on an outer periphery of the outer tube.

* * * * *